March 18, 1941.                W. W. ALBERS                 2,235,000
                                 FISH LURE
                             Filed Aug. 30, 1937
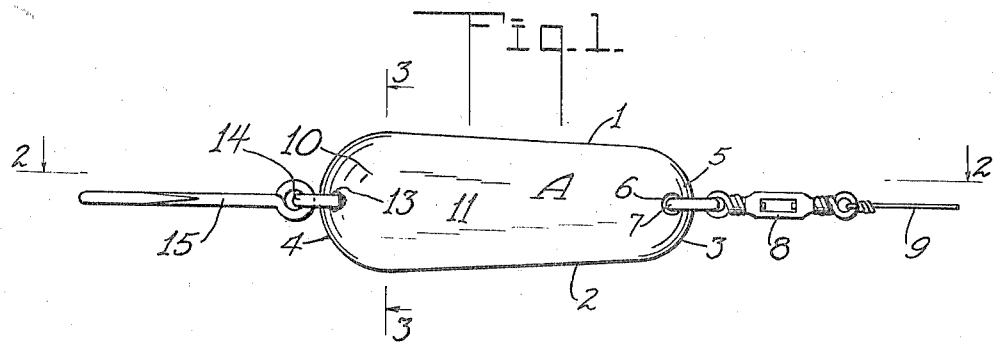
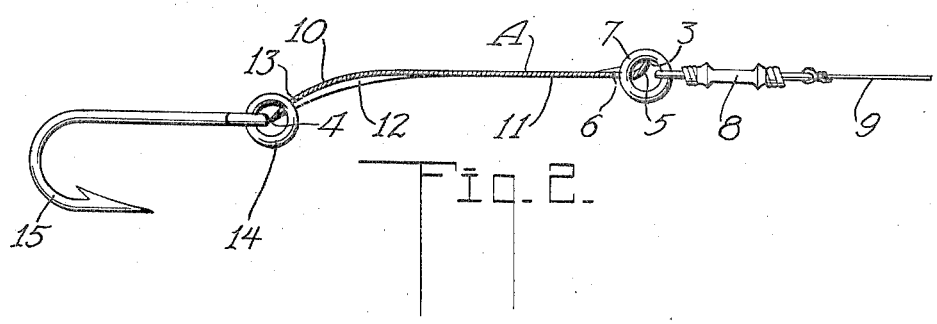
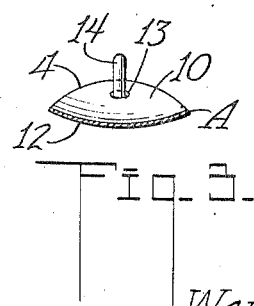
INVENTOR.
WALTER W. ALBERS
BY Munn, Anderson & Liddy
ATTORNEYS.

Patented Mar. 18, 1941

2,235,000

UNITED STATES PATENT OFFICE 2,235,000

FISH LURE

Walter W. Albers, San Francisco, Calif.

Application August 30, 1937, Serial No. 161,607

1 Claim. (Cl. 43—45)

My invention relates to improvements in a fish lure, and it consists of the combinations, constructions and arrangements hereinafter described and claimed.

An object of my invention is to provide a fish lure which is in the shape of a spoon and is designed to be connected between a swivel joint and a fish hook. In spoons, of which I am aware, the trolling of the line through the water will cause the spoon to wobble or rock from side to side regardless of the speed of the spoon through the water. I have found that by making the spoon of a particular shape, it will wobble when moved through the water at a slow speed and it will completely revolve or rotate when moved at a faster speed. The spoon is highly polished and when it revolves in the water it will closely simulate a live bait such as a minnow and this will cause larger fish such as salmon and bass to strike and be caught by the hook.

The spoon flares outwardly slightly from front to rear so that the rear portion of the spoon is wider than the front portion. The rear portion of the spoon is also curved so as to be inclined to the plane of the body of the spoon. It is this flared rear end of the spoon and the fact that the spoon is curved at its rear end, that will cause the spoon to revolve in the water when the spoon is moved at a predetermined speed. From actual experience, I have caught more fish by using this spoon than by using other types of spoons.

The invention is extremely simple in construction and is durable and efficient for the purpose intended.

Other objects and advantages will appear in the following specification, and the novel features of the device will be particularly pointed out in the appended claim.

My invention is illustrated in the accompanying drawing forming a part of this application, in which—

Figure 1 is a plan view of the spoon shown operatively connected between a swivel and a fish hook;

Figure 2 is a section through the spoon substantially along the line 2—2 of Figure 1; and Figure 3 is a transverse section through the spoon taken along the line 3—3 of Figure 1.

In carrying out my invention, I provide a spoon indicated generally at A. The spoon is made from a single piece of material and is highly polished. It will be noted from Figure 1 that the sides 1 and 2 of the spoon flare outwardly at an angle from a rounded front portion 3 of the spoon to a rounded rear portion 4. In Figure 2, I show the front rounded portion 3 curved slightly as indicated at 5 for providing a more pleasing finish to the spoon. I have found, however, that this curved portion does not aid in the revolving of the spoon in the water when it is moved therethrough, and therefore it may be dispensed with. The front portion 3 has an opening 6 therein, for receiving a ring 7 that is connected to a swivel 8. A fish line 9 is connected to the free end of the swivel.

The rear end of the spoon is curved as at 10, see Figure 2, from the flat surface 11 and it will be noted that this curvature extends in a direction opposite to the curved portion 5. The curvature 10 is quite pronounced and the rear portion 4 is also curved slightly in a transverse direction as shown at 12 in Figure 3. This gives a spoon-shaped effect to the rear portion 4. It is this pronounced curved portion 10 that acts in much the same manner as a propeller blade and causes the spoon to completely revolve or rotate when the spoon is moved through the water at a predetermined speed. A movement of the spoon through the water at a slower speed will cause the spoon to wobble or gently rock from side to side in the water.

The rear portion 4 of the spoon has an opening 13 therein and receives a ring 14 and the ring in turn is connected to a fish hook 15. The ring 14 will cause the hook 15 to rotate with the spoon A, although it is obvious that the hook may be swivelly connected to the spoon and thus permit the spoon to rotate independently of the hook.

From the foregoing description of the various parts of the device, the operation thereof may be readily understood.

It is unnecessary to bait the hook when using the spoon. The gyrations of the spoon in the water will attract the fish because the complete revolving of the spoon in the water will cause the spoon to closely simulate the action of live bait in the water.

While I have shown only the preferred form of my invention, it should be understood that various changes or modifications may be made within the scope of the appended claim without departing from the spirit of the invention.

I claim:

A fish lure comprising a spoon having rounded leading and trailing edges of substantially the same diameter with straight side edges lying tangent with and merging into the leading and trailing edges, the trailing portion of the spoon being gradually curved longitudinally and starting substantially from the middle of the spoon to provide a spoon short in length, said trailing portion also being dish-shaped transversely and curving away from the body of the spoon to a marked degree, the leading portion of the spoon being abruptly curved near the leading edge in a direction opposite to the trailing portion, the curvature of the trailing portion starting from about the center of the spoon causing the spoon to rock when moved slowly through the water and to revolve when moved rapidly through the water.

WALTER W. ALBERS.